Dec. 16, 1952     W. H. COULTER ET AL     2,622,150
INTERFERENCE ELIMINATING DEVICE FOR MEASURING INSTRUMENTS
Filed Jan. 13, 1949                         2 SHEETS—SHEET 1

Inventors
Wallace H. Coulter
Joseph Richard Coulter Jr.
By J. Irving Silverman
attorney Dec. 16, 1952     W. H. COULTER ET AL     2,622,150
INTERFERENCE ELIMINATING DEVICE FOR MEASURING INSTRUMENTS
Filed Jan. 13, 1949     2 SHEETS—SHEET 2
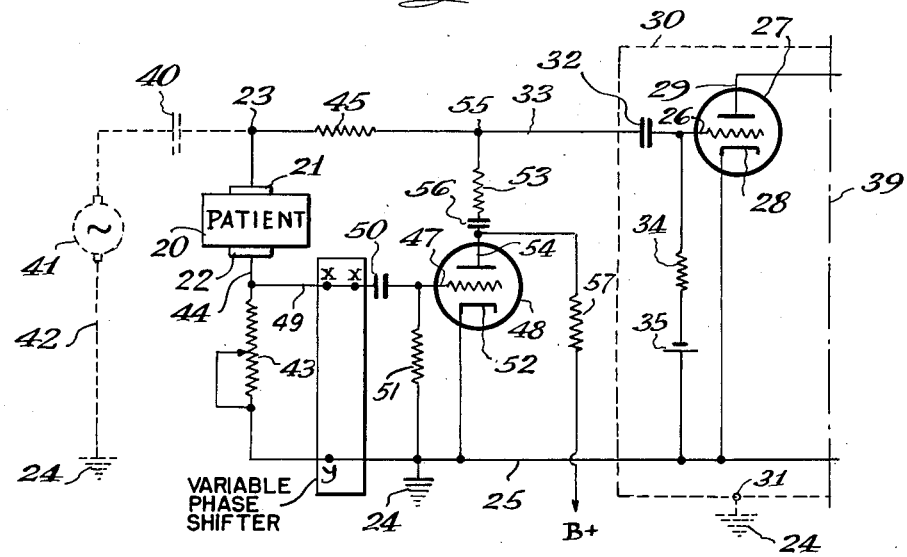
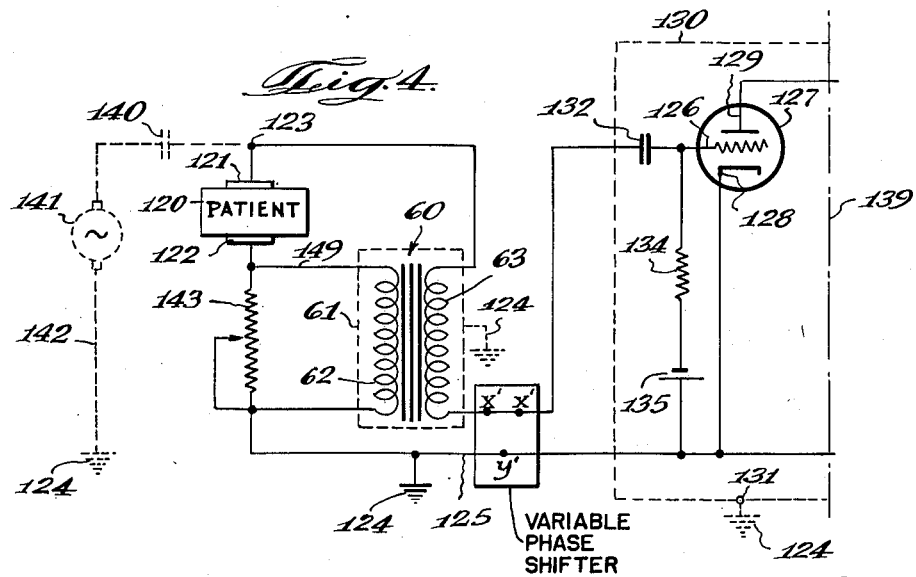

Patented Dec. 16, 1952

2,622,150

UNITED STATES PATENT OFFICE 2,622,150

INTERFERENCE ELIMINATING DEVICE FOR MEASURING INSTRUMENTS

Wallace H. Coulter, Chicago, Ill., and Joseph Richard Coulter, Jr., Monroe, La.

Application January 13, 1949, Serial No. 70,682

14 Claims. (Cl. 178—44)

This invention relates generally to measuring instruments and more specifically to means for cancelling or minimizing certain unwanted and undesirable signals encountered in the use of certain measuring instruments.

The instruments with which our invention is intended to be associated comprise high sensitivity amplifiers such as used in connection with electrocardiography. Such amplifiers are intended to magnify minute electrical signals comprising varying voltages, which are generated by a human body, or parts thereof in order to record and observe the same with the view towards physiological or pathological diagnosis. One difficulty of using such high sensitivity instruments is that in addition to the desired signal, there may be extraneous interfering signals and noise superimposed upon the desired signal and tending to obscure, distort, or even overshadow said desired signal by reason of their magnitude, to such an extent that the value of the record of the desired signal is substantially decreased.

Accordingly, the principal object of this invention is to provide a device for substantially decreasing the stray or unwanted interfering signals whereby to increase the clarity and hence the diagnostic value of the record obtained from the instrument with which said device is associated.

The stray voltages above referred to comprise especially interference from electrical mains and other sources of noise or unwanted voltage, coupled by stray capacitance through the source of desired signal voltage, such as for example a patient, and the leads associated with the source of desired voltage, to the measuring instrument, and fed to said instrument together with the signal voltage. A further object of the invention, therefore, comprises the provision of a circuit for substantially eliminating the extraneous and interfering signals thus coupled to the measuring instrument.

The unwanted voltages in most cases are primarily hum from the power mains, and it is an ancillary object of the invention to minimize hum in the type of measuring instrument with which this invention is concerned.

Still a further object of the invention is to provide a circuit of the character described in which a small sample of the interfering signal is amplified and inverted as to its phase, the resulting or mirror signal being fed to the measuring amplifier simultaneously with the desired signal carrying said interfering signal whereby the interference is substantially cancelled.

Other objects of the invention lie in the provision of novel amplifying and phase inverting circuits for accomplishing the purposes of our invention.

Still another object of the invention lies in the provision in combination with the amplifying and phase inversion circuits, of means for shifting the phase of the mirror signal in cases where the interference signal is not exactly 180° out of phase therewith.

Other objects and advantages of the invention will be apparent from the following description of the circuits comprising our invention and the parts thereof hereinafter fully described and illustrated in the accompanying drawings and pointed out with particularity in the claims, it being obvious that minor changes can be made without departing from the spirit of the invention.

A preferred embodiment is illustrated in the accompanying drawings in which:

Fig. 3 is a circuit diagram showing an application of our invention to an instrument for measuring voltages produced by a patient, the amplifying and phase inverting being accomplished by means of a vacuum tube circuit.

Fig. 4 is a circuit diagram similar to that of Fig. 3 except that the amplification and phase inversion is accomplished by means of a step-up transformer.

Figure 5:
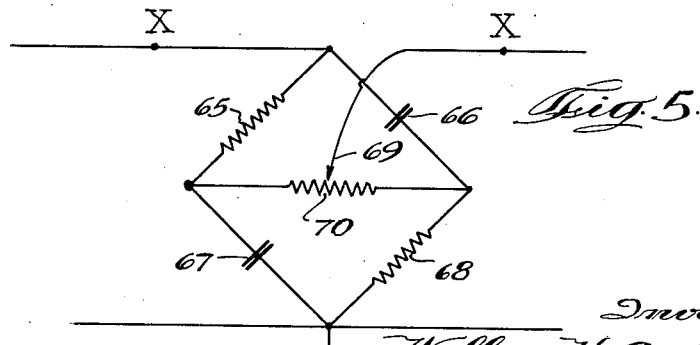

Fig. 5 is a schematic circuit diagram of a refinement of our invention comprising means for slightly shifting the phase of the mirror signal $e_m$ to be exactly 180° out of phase with the undesired signal $e_i$. The network illustrated in this figure is intended to be attached to the circuits illustrated in Figs. 3 and 4 inserting the points X—X and X'—X' of said network in substitution of the points X—X of the circuits of Figs. 3 and 4 respectively, and by connecting the point Y of the network at the point Y or Y' of the respective circuits illustrated in said figures.

Figure 1:
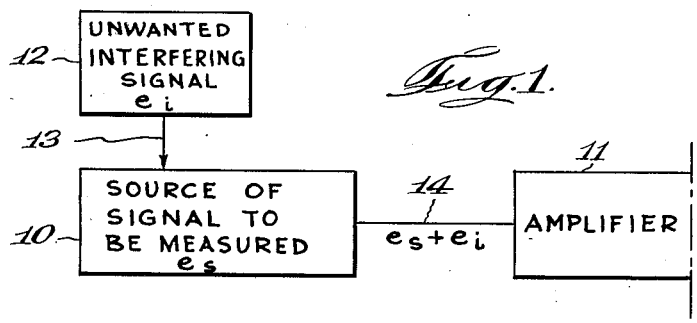
Fig. 1 is a block diagram showing the manner in which a high gain amplifier is utilized to measure a signal and showing the addition of the undesired interfering signal to the desired signal. The invention is not associated with this arrangement.

Referring now to the figures, in Fig. 1 there is illustrated a typical measuring circuit. The block 10 corresponds to a source of signal voltages which may be of any varying character, such as for example that generated by the cardiac muscles of an animal or the like. The block 11 represents a high sensitivity amplifier in which the signal $e_s$ is intended to be amplified for recording and observation. The broken line at the right hand side of the amplifier 11 signifies that the remainder of the instrument may be of any form and the invention is not intended to be limited to any specific nature thereof. The block designated 12 corresponds to a source of unwanted interfering signal. This signal is designated $e_i$ and may be produced by reason of coupling through stray capacitance, and perhaps other impedances of gaseous discharge devices, and other noise sources with the signal source 10. The path of this unwanted signal is designated 13 schematically, the signal $e_i$ being actually a conglomerate of such unwanted voltages and the source 12 being the equivalent combined source thereof. The voltage which is fed to the amplifier 11 by way of the path schematically designated 14 is therefore $e_s$ plus $e_i$. The amplifier 11 and associated instruments (not shown) as a rule are not constructed to discriminate between the two signals and hence the eventual record is distorted and obscured by the signal $e_i$. As indicated above, the greatest sources of the voltage $e_i$ comprise the electrical mains producing 60 cycle hum which is capable of obliterating the signal $e_s$ in the instrument output.

Our invention consists of providing a means for sampling the voltage $e_i$ which will not materially affect the strength of the signal $e_s$, inverting and amplifying the sample signal until it is of a magnitude substantially equal to the signal $e_i$ but of a phase which is 180° relative to that of the signal $e_i$. The signal thus produced is therefore a mirror signal $e_m$ of the unwanted voltage, and can be fed to the amplifier 11 along with the signals $e_i$ and $e_s$ thereby cancelling the effect of $e_i$ and permitting the amplifier and associated instruments to act only upon the signal $e_s$.

Figure 2:
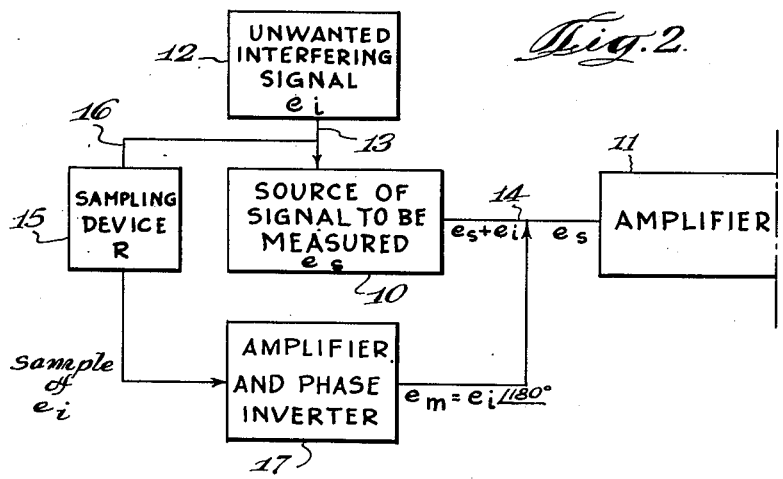
Fig. 2 is a block diagram of the same arrangement but having our invention associated therewith whereby a sample of the interfering voltage is amplified and its phase inverted until it is equal in magnitude but opposite in phase, and then fed into the amplifier whereby to cancel the effects of said interfering voltage.

The above described invention is diagrammatically illustrated in Fig. 2, which is a modified form of Fig. 1. As before, the interfering source 12 and the signal source 10 both provide the signals $e_s$ plus $e_i$ which are fed through the path 14 to the amplifiers 11. In addition to the above, however, there is provided a sampling device 15 which, in the embodiment to be described comprises a variable resistance having a predetermined relationship with the input impedance of the amplifier and is indicated in the block as R, which diverts a portion of the signal $e_i$ by way of the path 16 and feeds it to an amplifier and phase inverter, indicated by the block 17 to produce the mirror voltage $e_m$ which is substantially of the same magnitude as the voltage $e_i$ but 180° out of phase therewith. This mirror voltage $e_m$ is fed to the amplifier 11 by the path 18, whereby the effect thereof is to substantially cancel $e_i$.

In the above explanation, it is to be understood that the block diagrams and the paths indicated are in no way intended to represent electrical connections, but are merely used for the purpose of illustrating the operation of the invention. The actual electrical connections utilized and the theory of our invention will be hereinafter set forth.

Referring now to the Fig. 3, the source of signal voltage $e_s$ is shown as a patient arranged to have his cardiac potential studied. The patient is indicated schematically at 20 having the electrodes 21 and 22 attached thereto for the purpose of providing a signal voltage $e_s$ appearing between the point 23 and ground 24. Obviously the bottom lead 25 of the circuit illustrated is also at ground potential. The signal $e_s$ is ideally impressed upon the grid 26 of the first stage of the measuring amplifier which in this case may be an electrocardiagraph. The vacuum tube 27 comprising a part of this first stage is shown as including a cathode 28 and plate 29, although it is not intended by the illustration to limit the form which the input of the instrument will take. The first stage of the instrument obviously will be shielded as indicated at 30 and the shield grounded at 31 to ground 24. Suitable coupling means are provided, such as for example by means of the condenser 32 in the lead 33. Likewise any conventional method of biasing the grid 26 may be used such as for example by the grid resistor 34 and battery 35. The broken line 39 emphasizes the fact that only a portion of the instrument is illustrated.

Theoretically this is a simple arrangement whereby the voltage $e_s$ producing the desired signal is amplified and used, but actually there are a myriad of paths between the patient 20 and many outside sources of noise, hum, and interfering voltages which are not readily apparent. These produce many signals between the point 23 and ground so that they are combined with the signal $e_s$ and impressed upon the grid 26. The coupling between the patient and these sources is principally caused by stray capacitance, although this coupling may include other impedance serving to affect the phase of the unwanted signals. Considering however, for the purposes of describing the invention, that the coupling is predominantly capacitive, the stray couplings may be lumped as a theoretical single capacitance designated 40, the sources of interfering voltage may be designated as lumped in a single generator 41, and the path from the point 23 to ground 24 of the unwanted signal $e_i$ may consist of the broken line designated 42.

The internal impedance of the patient 20 may be of the order of 5000 ohms while the input impedance of the tube 27 may be of the order of 100 times or more than that of the patient 20. If, therefore, a resistance is inserted in the circuit of the patient, the ohmage of which is substantially smaller than the impedance of the amplifier input, the major portion of the signal $e_s$ will appear across the amplifier input and be acted upon. At the same time, however, there will appear across the added resistance a voltage which is identical as to phase and character with the voltage $e_i$ although smaller in magnitude. The resistor 43 is inserted in the lead 44 which extends between the electrode 22 and the ground lead 25. This resistor 43 is variable as symbolically indicated and is intended to have its resistance generally less than the internal impedance of the patient 20. In practise this resistor may be variable from 0 to 2000 ohms. Considering the circuit defined by the lead 42, generator 41, coupling capacitance 40, patient 20, lead 44, resistor 43, and ground, the voltage $e_i$ produced by generator 41 will be divided between the patient and the resistor 43 proportionally according to their impedances. The greatest voltage corresponding to $e_i$ will appear between point 23 and ground to be impressed upon the grid 26 through the resistor 45 and the lead 33 and coupling condenser 32. There is a sample voltage across 43 which is identical in phase and characteristics to voltage $e_i$ except that it is of lesser magnitude. This sample voltage is now impressed upon the grid 47 of the amplifying tube 48 by the lead 49 and coupling condenser 50. The grid 47 is biased by any conventional means such as for example grid resistance 51. The cathode of the tube 48 is indicated at 52.

The effect of the tube 48 is such that a signal appears as the output of said tube, the major portion of which is across the resistor 53 of the plate 54 which is a mirror voltage of $e_i$, being capable of being adjusted to the identical magnitude of $e_i$ by the varying of resistor 43, the amplification of the tube 48 serving to increase same, and being inverted as to phase due to the inherent characteristics of a vacuum tube. This voltage, which may be designated $e_m$ now appears between point 55 and ground 24 and is also impressed upon the grid 26 at the same time as the voltages $e_s$ and $e_i$ are so impressed. The obvious result is the cancellation of the voltages $e_i$ and $e_m$ by one another, leaving the pure signal voltage $e_s$ to go to the amplifier. The condenser 56 is a blocking condenser and the resistor 57 is a plate bias limiter.

From the nature of the circuit it will be seen that the resistors 45 and 53 comprise a voltage divider relative to the voltage $e_m$ and in order to cause a substantial portion of the desired $e_m$ to appear from the point 55 to ground, the value 53 will preferably be substantially greater than the value of 45. In practise the resistor 45 is about 100,000 ohms and 53 is about 5 times as large, so that substantially five sixths of the total signal $e_m$ produced by the tube 48 will be available for cancelling $e_i$. These proportions are not intended to be limiting.

It should be obvious that the proportion of the desired signal $e_s$ appearing across the resistor 43 will be so small compared to that appearing at point 55 as to be practically negligible.

In increasing the value of the resistance of 43 the nature of the circuit including the generator 41 is such that the interfering voltage $e_i$ will likewise increase at the point 23. The rate of such increase is, however, considerably less than the rate of increase of $e_m$ occasioned by increase of the value of resistor 43 by reason of the amplification factor introduced by the tube 48, so that a point is reached where the voltage $e_m$ is sufficient to cancel not only the original voltage $e_i$ but as well that increase in voltage $e_i$ occasioned by increasing the load resistance of the generator 41.

Considering now, Fig. 4, we have provided modified form of amplifying and phase inverting means. In the illustration, those parts of Fig. 3 which have been duplicated have been designated by the same reference characters used in said Fig. 3 with the exception that said duplicated reference characters have been increased by one hundred to enable differentiation to be made between the figures. Instead of the tube 48 and its associated circuit elements, a transformer 60 has been utilized. The transformer 60 is shielded as indicated at 61, and the shielding is grounded as shown. The primary 62 is across the resistance 143 in order that the sample voltage $e_i$ be impressed thereacross. The secondary 63 of the transformer 60 is connected so that the voltage $e_m$ appearing across the same will be bucking the voltage $e_i$ appearing from point 123 to ground 124. Also, the turn ratio of the transformer is such that the voltage of the primary 62 will be stepped up in the secondary.

It will be seen that the transformer serves the identical purpose in this circuit that the tube 48 and associated circuit elements serves in the circuit of Fig. 3.

Generally the phase of the voltage $e_i$ appearing across the resistor 43 or the resistor 143, or across the sampling device 15 as it is designated in Fig. 2 is so nearly in phase with the interfering voltage that simple phase reversing devices suffice to obtain the mirror or bucking voltage $e_m$ exactly 180° out of phase with the interfering voltage $e_i$. It sometimes occurs, however, that there is a phase discrepancy between the interfering voltage $e_i$ and that sample appearing across the sampling device, as a result for example of the impedance of the source of signal voltage $e_s$ being other than pure resistance. Under such circumstances it is desirable further to modify the mirror voltage $e_m$ to compensate for this discrepancy, and thereby to make available phase shifts of other than 180° for the mirror voltage.

A simple device for providing relatively small phase shifts may easily be incorporated into our circuits. Such a device would be inserted at any suitable place in the circuits shown in Figs. 3 and 4, and an example thereof is diagrammatically illustrated in Fig. 5. There is provided a simple bridge network which is normally balanced having the arms 65 and 66 of the same impedance, while the arms 67 and 68 are of the same impedance. As symbolically designated, 65 and 68 are pure resistance, while 66 and 67 are substantially capacitive, the impedance being determined as the reactance at the principal frequency of the interfering signal $e_i$ which in most cases will be 60 cycles. With the tap 69 at the electrical center of the resistor 70 there is no phase shift, but moving same one way or the other enables a phase shift to be made in the signal $e_m$ appearing at the amplifier input. Obviously any other suitable phase trimming device may be utilized.

It is believed that the invention as set forth and all of its advantages should be readily understood without further explanation and description and it is to be understood that the circuits illustrated and described are merely examples and not intended to limit the invention since same may be made in any desired form within the purview of the invention as defined in the appended claims. It is also desired to point out that the invention is not intended to be limited in any way by the theory of operation thereof set forth herein, same being merely to aid in the understanding of the invention and perhaps clarify the functions of the circuits described.

What it is claimed and desired to secure by Letters Patent of the United States is:

1. In a device for studying a desired signal produced in a source having stray coupling with sources of interfering voltages producing an undesired signal, said device including a high impedance input amplifier and said signals both being impressed upon said amplifier, a circuit for minimizing the undesired signal comprising means for producing a sample of said undesired signal substantially free of the desired signal, a phase inverter and sample amplifier, means feeding the sample signal to the inverter and sample amplifier whereby to produce a mirror signal of same characteristics and magnitude as said unwanted signal, albeit substantially 180° out of phase therewith, and means for introducing said mirror signal into said first mentioned amplifier simultaneously with said desired and undesired signals whereby to effect substantially intercancellation between said mirror and undesired signals, said sample producing means comprising an impedance element connected in series with said desired signal source and ground and having a value of impedance greatly smaller than that of the input circuit of said first mentioned amplifier.

2. A device as described in claim 1 in which the phase inverter and sample amplifier comprise a stage of vacuum tube amplification.

3. A device as described in claim 1 in which the phase inverter and sample amplifier comprise a step-up transformer the primary of which is connected across the sample producing impedance element, and the secondary of which is connected to the input of the first mentioned amplifier.

4. In an instrument for amplifying a desired signal occurring across a subject source in an electrical path from a potential point to ground, said subject source being coupled to sources of interfering voltage whereby an undesired signal is simultaneously produced from said point to ground tending to obscure the desired signal, and said subject source having means connecting same in said path, said point being coupled to a portion of said instrument of relatively high impedance input compared with the internal impedance of said subject, the herein invention which consists of resistance means connected in series with said subject connecting means whereby to cause a sample of said undesired signal to appear across said means, means capable of amplifying and inverting the phase of said signal and having its input connected across said resistance means and its output coupled to said high impedance input.

5. In an instrument for amplifying a desired signal occurring across a subject source in an electrical path from a potential point to ground, said subject source being coupled to sources of interfering voltage whereby an undesired signal is simultaneously produced from said point to ground tending to obscure the desired signal, and said subject source having means connecting same in said path, said point being coupled to a portion of said instrument of relatively high impedance input compared with the internal impedance of said subject, the herein invention which consists of resistance means connected in series with said subject connecting means of ohmage less than said subject whereby to cause a sample of said undesired signal to appear across said means, means capable of amplifying and inverting the phase of said signal and having its input connected across said resistance means and its output coupled to said high impedance input, and said resistance means being variable whereby the output of said amplifying and inverting means may be adjusted to provide a cancelling mirror signal equivalent to said undesired signal and 180° out of phase therewith.

6. In an instrument for amplifying a desired signal occurring across a subject source in an electrical path from a potential point to ground, said subject source being coupled to sources of interfering voltage whereby an undesired signal is simultaneously produced from said point to ground tending to obscure the desired signal, and said subject source having means connecting same in said path, said point being coupled to a portion of said instrument of relatively high impedance input compared with the internal impedance of said subject, the herein invention which consists of resistance means connected in series with said subject connecting means of ohmage less than said subject whereby to cause a sample of said undesired signal to appear across said means, means capable of amplifying and inverting the phase of said signal and having its input connected across said resistance means and its output coupled to said high impedance input, said amplifying and inverting means comprising a vacuum tube amplifier the grid circuit of which is coupled to the resistance means whereby to receive the sample signal, and the plate circuit of which is coupled to the high impedance input.

7. In an instrument for amplifying a desired signal occurring across a subject source in an electrical path from a potential point to ground, said subject source being coupled to sources of interfering voltage whereby an undesired signal is simultaneously produced from said point to ground tending to obscure the desired signal, and said subject source having means connecting same in said path, said point being coupled to a portion of said instrument of relatively high impedance input compared with the internal impedance of said subject, the herein invention which consists of resistance means connected in series with said subject connecting means whereby to cause a sample of said undesired signal to appear across said means, means capable of amplifying and inverting the phase of said signal and having its input connected across said resistance means and its output coupled to said high impedance input, said amplifying and inverting means comprising a vacuum tube amplifier the grid circuit of which is coupled to the resistance means whereby to receive the sample signal, and the plate circuit of which is coupled to the high impedance, a resistor connected to said high potential point, and a second resistor in the plate circuit, both resistors being commonly connected to coupling means associated with said high impedance input and said plate resistor being substantially greater in ohmage than the first resistor whereby the major portion of the output signal of said vacuum tube amplifier will appear across said plate resistor, and consequently be coupled to said high impedance input.

8. In a device for studying a desired signal produced in a relatively low impedance source having stray coupling with sources of interfering voltage producing an undesired signal, said device including a high impedance input amplifier and said signals both being impressed upon said amplifier, a circuit for minimizing the undesired signal comprising means for producing a sample of said undesired signal substantially free of the desired signal comprising an impedance element connected in series with said desired signal source and having an impedance value greatly less than that of said amplifier input, a phase inverter and sample amplifier, means feeding the sample signal to the inverter and sample amplifier whereby to produce a mirror signal of same characteristics and magnitude as said unwanted signal, albeit substantially 180° out of phase therewith, means for introducing said mirror signal into said first mentioned amplifier simultaneously with said desired and undesired signals whereby to effect substantially intercancellation between said mirror and undesired signals, and means for trimming the phase of said mirror signal associated with said phase inverter and sample amplifier and adapted to compensate for other than 180° differences between the phases of the undesired and mirror signals.

9. In a device for studying a desired signal produced in a source having stray coupling with sources of interfering voltage producing an undesired signal, said device including a high impedance input amplifier and said signals both being impressed upon said amplifier, a circuit for minimizing the undesired signal comprising means for producing a sample of said undesired signal substantially free of the desired signal comprising an impedance element connected in series with said desired signal source and having an impedance value greatly less than that of said amplifier input, a phase inverter and sample amplifier, means feeding the sample signal to the inverter and sample amplifier whereby to produce a mirror signal of same characteristics and magnitude as said unwanted signal, albeit substantially 180° out of phase therewith, means for introducing said mirror signal into said first mentioned amplifier simultaneously with said desired and undesired signals whereby to effect substantially intercancellation between said mirror and undesired signals, and means for trimming the phase of said mirror signal comprising a bridge network connected with said sample producing means and having a tapped impedance across the central junctions of said bridge, the tap of said impedance being movable on opposite sides of the electrical center thereof whereby to provide phase shifts of the mirror signal.

10. In an instrument for amplifying a desired signal occurring across a subject source in an electrical path from a potential point to ground, said subject source being coupled to sources of interfering voltage whereby an undesired signal is simultaneously produced from said point to ground tending to obscure the desired signal, and said subject source having means connecting same in said path, said point being coupled to a portion of said instrument of relatively high impedance input compared with the internal impedance of said subject, the herein invention which consists of resistance means connected in series with said subject connecting means and to ground whereby to cause a sample of said undesired signal to appear across said resistance means, means capable of amplifying and inverting the phase of said signal and having its input connected across said resistance means and its output coupled to said high impedance input, and means for trimming the phase of said mirror signal associated with said phase inverter and amplifier and adapted to compensate for other than 180° differences between the phases of the undesired and mirror signals.

11. An interference eliminating device adapted to feed an instrument for amplifying a desired signal occurring across a subject source in an electrical path, said source having electrical connecting means inserting said source in said path, the desired signal occurring across said source and said source being coupled with an input portion of said amplifying instrument having a high impedance compared with the internal impedance of the source, said source being coupled with and subject to the influence of external means producing interfering voltages giving rise to an undesired signal in said source simultaneously with said desired signal across said source and to ground tending to obscure the said desired signal, the herein invention which consists of resistance means in said path connected in series with said connecting means and to ground whereby to cause a sample of said undesired signal to appear across said resistance means, a phase inverter having the resistance means connected to its input and having its output coupled to said amplifying instrument, whereby the signal output of the said phase inverter will tend to cancel the undesired signal which is fed by the source directly to said amplifying instrument.

12. A device as described in claim 11 in which the phase inverter is constructed to amplify the input from said resistance means, and said device has means for varying the signal output of the said phase inverter to enable the amplitude thereof to be adjusted to the amplitude of said directly fed undesired signal.

13. In a device for studying a desired signal emanating from a source of voltage having stray coupling with external signal generating means producing an undesirable and interfering signal voltage, said interfering signal voltage and desired signal voltage together appearing across said source and being coupled together to the input of a detector, a circuit for providing a signal which when fed to said detector will minimize the undesired signal, and which comprises a resistance device connected in series between said source and ground, a voltage amplifying and inverting means connected with the resistance device to be impressed with the voltage appearing across the resistance device, said resistance device having an ohmage very much less than the internal impedance of said detecting device whereby although in series with said source, the desired voltage substantially completely will be impressed upon said detector while a portion of the undesired voltage will appear across said resistance device, said last mentioned means having its output also connected to the detector so that the undesirable voltage amplified and inverted as to phase is enabled to counteract the undesired signal voltage provided from said source.

14. A structure as defined in claim 13 in which the resistance device is variable so that the undesired inverted signal may be adjusted to have substantially the identical amplitude as the undesired signal from said source.

WALLACE H. COULTER.
JOSEPH RICHARD COULTER, JR.

REFERENCES CITED

The following references are of record in the file of this patent:

UNITED STATES PATENTS

| Number | Name | Date |
| --- | --- | --- |
| 1,888,139 | Nichols | Nov. 15, 1932 |
| 2,294,627 | Parr | Sept. 1, 1942 |
| 2,438,217 | Johnson | Mar. 23, 1948 |
| 2,456,401 | Gilmore | Dec. 14, 1948 |